United States Patent
Zhang et al.

(10) Patent No.: US 9,413,004 B2
(45) Date of Patent: Aug. 9, 2016

(54) MAGNESIUM BATTERY HAVING A CATHODE CONTAINING MANGANESE DIOXIDE NANOPARTICLES AS ACTIVE MATERIAL

(71) Applicant: Toyota Motor Engineering & Manufacturing North America, Inc., Erlanger, KY (US)

(72) Inventors: Ruigang Zhang, Ann Arbor, MI (US); Fuminori Mizuno, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 207 days.

(21) Appl. No.: 13/850,695

(22) Filed: Mar. 26, 2013

(65) Prior Publication Data

US 2014/0295278 A1   Oct. 2, 2014

(51) Int. Cl.
*H01M 4/50* (2010.01)
*H01M 10/054* (2010.01)
*H01M 4/46* (2006.01)
*H01M 4/505* (2010.01)
*H01M 4/38* (2006.01)

(52) U.S. Cl.
CPC ............ *H01M 4/502* (2013.01); *H01M 10/054* (2013.01); *H01M 4/381* (2013.01); *H01M 4/466* (2013.01); *H01M 4/505* (2013.01); *Y10T 428/2982* (2015.01)

(58) Field of Classification Search
None
See application file for complete search history.

(56) References Cited

U.S. PATENT DOCUMENTS

| | | | |
|---|---|---|---|
| 5,180,642 A * | 1/1993 | Weiss et al. | 429/90 |
| 5,604,057 A | 2/1997 | Nazri | |
| 6,585,881 B2 | 7/2003 | Davis et al. | |
| 7,501,208 B2 | 3/2009 | Feddrix et al. | |
| 2005/0135993 A1 | 6/2005 | Xu et al. | |
| 2008/0096109 A1* | 4/2008 | Fukumine et al. | 429/212 |
| 2009/0068568 A1 | 3/2009 | Yamamoto et al. | |
| 2009/0249614 A1* | 10/2009 | Davis et al. | 29/623.1 |
| 2010/0196762 A1 | 8/2010 | Yamamoto et al. | |
| 2011/0070487 A1 | 3/2011 | Padhi et al. | |
| 2013/0004830 A1 | 1/2013 | Song et al. | |
| 2013/0004850 A1 | 1/2013 | Shon et al. | |

OTHER PUBLICATIONS

Pang et al. (J. Nanomater. vol. 2012, Article ID 607870 published on Jan. 1, 2012).*
Ni et al. (J. Phys. Chem. C 2009, 113, 54-60).*
Zhang et al. (Internat. J. Hydrogen Energy, 36 ( 2011) 11760-11766).*
U.S. Appl. No. 13/850,752, filed Mar. 26, 2013, Mizuno, et al.

* cited by examiner

*Primary Examiner* — Carlos Barcena
*Assistant Examiner* — Wojciech Haske
(74) *Attorney, Agent, or Firm* — Oblon, McClelland, Maier & Neustadt, L.L.P.

(57) ABSTRACT

A $MnO_2$ electrode active material of high capacity is provided. The high capacity $MnO_2$ has a surface area which is greater than 60 $m^2/g$ and the $MnO_2$ is obtained by a process comprising a redox reaction of a Mn (II) salt and permanganate at a reaction temperature less than 30° C. and a pH of 2 to 4. Also provided are a magnesium electrochemical cell having a cathode containing the $MnO_2$ and a rechargeable magnesium battery having a cathode containing the $MnO_2$.

16 Claims, 6 Drawing Sheets

MAGNESIUM BATTERY HAVING A CATHODE CONTAINING MANGANESE DIOXIDE NANOPARTICLES AS ACTIVE MATERIAL

BACKGROUND OF THE INVENTION

1. Field of the Invention

This invention is directed to a magnesium electrochemical cell containing as an active cathode material of $MnO_2$ nanoparticles which have a surface area greater than 60 $m^2/g$ and which provides high cell capacity and increased cycle lifetime. The invention is further directed to a magnesium battery containing a cathode having the $MnO_2$ according to the invention as an active ingredient.

2. Discussion of the Background

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/mole of electrons and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Magnesium (Mg) batteries are being researched as a candidate for post lithium-ion systems. They are expected to be high energy battery systems, due to the high volumetric capacity made available via the two electron transfer per Mg. However, a cathode active material compatible with magnesium and providing high capacity and durability is a subject of much ongoing investigation.

Examples of cathode active materials for magnesium electrochemical cells which are conventionally known include sulfur, $MnO_2$ and a Chevrel compound having a formula $Mg_xMo_6T_n$, wherein x is a number from 0 to 4, T is sulfur, selenium or tellurium, and n is 8.

The inventors have previously identified a K ion stabilized $\alpha$-$MnO_2$ as showing very high reversible capacity (U.S. 2013/0004830 A1).

It is conventionally known that $MnO_2$ can assume various polymorphic phases depending on factors which include, for example, method of synthesis, thermal history and age. The polymorphic phases may be described in terms of the structural relationship of $MnO_6$ octrahedra which may be linked at corners and edges. Three main groups of structures of the octahedral framework are known and are designated as: 3D tunnels, 2D layers and 1D channel.

Of these groups $MnO_2$ with 3D tunnels is described as the spinel phase which can be synthesized via solid state reaction at elevated temperatures, typically temperatures of about 750° C.

The 2D layered $MnO_2$ may be prepared by "low temperature" methods, such as by oxidation reaction in an alkaline solution or by a reduction of permanganates in an acid medium. Normally, this type of $MnO_2$ is of poor crystallinity and contains a significant amount of water as well as stabilizing cations such as $K^+$ between the sheets of $MnO_6$ octrahedra.

The 1D channel framework $MnO_2$ includes a broad range of polymorphic structures classified as $\alpha$-, $\beta$-, $\delta$- and $\gamma$-phases. Under certain circumstances these phases may be interchangeable depending on temperature and solution form.

However, the physical and chemical factors related to the various phases of $MnO_2$ which affect the capacity of the material as a cathode active agent and how to optimize those physical factors to improve cathodic performance has not been described.

Yamamoto et al. (U.S. 2010/0196762) describes a manganese oxide obtained by reduction of potassium permanganate in hydrochloric acid, filtration and washing of the formed precipitate, then drying and heat treating at 300 to 400° C. There is no description of surface area of the particles or relationship of surface area to performance. Mg electrochemical cells are recited in Claims 14 to 16.

Shon et al. (U.S. 2013/0004850) describe an ordered porous manganese oxide of formula:

wherein a ratio y/x is less than 2. Example compounds include MnO, $Mn_2O_3$, and $Mn_3O_4$. The porous manganese oxide is prepared by impregnating a template material such as $SiO_2$ with a solution or melt of a Mn salt, sintering the impregnated material to obtain a composite and then chemically removing the template from the resulting porous manganese oxide. Sintering temperatures of 300 to 700° C. are suitable for the preparation. The specific surface area of the porous manganese oxide is from about 50 to 250 $m^2/g$. Use of the porous manganese oxide as an active component of an electrode is described. Specifically, utility as a positive active material in lithium batteries or electrochemical cells and capacitors is disclosed.

Padhi et al. (U.S. 2011/0070487) describe manganese oxides having octahedral molecular sieve structure as active catalyst materials for a metal-air cell. $Mn_2O_3$ is disclosed as a component of the manganese oxide. The octahedral manganese oxide is obtained by redox reaction of a manganese salt such as manganese sulfate ($MnSO_4$) or manganese nitrate ($Mn(NO_3)_2$) with a permanganate in aqueous acid, at a pH less than about 4.5 at a temperature of 50° C. to 70° C. The material obtained is described as cryptomelane and this synthesis product is dried and calcined at a temperature of from 95 to about 650° C. In preferred embodiments, calcination is conducted at temperatures of from 450 to 650° C. Construction of an electrochemical cell, i.e., a metal-air cell employing the calcined cryptomelane as cathode active ingredient is disclosed. The metal of the anode is zinc, lithium or aluminum.

Yamamoto et al. (U.S. 2009/0068568) describe a magnesium ion containing non-aqueous electrolyte for an electrochemical device such as a magnesium battery. The electrolyte is prepared by addition of magnesium metal to an ether solution mixture of a halogenated hydrocarbon, an aluminum halide and a quaternary ammonium salt. The mixture is heat treated to obtain the electrolyte. A magnesium battery containing the electrolyte is disclosed wherein a positive electrode containing an oxide or halide of a metal such as scandium, copper, chromium and manganese among others is described.

Xu et al. (U.S. 2005/0135993) describe an amorphous nanostructured cation-doped manganese oxide which is prepared by reduction of an aqueous permanganate solution to form a hydrogel of manganese oxide containing a dopant cation. The hydrogel is cryogenically frozen and vacuum dried to obtain a product having a BET surface area of greater than 300 m$^2$/g. High performance is attributed to the high surface area nano-architecture of the manganese oxide. Electrochemical cycling performance with nonaqueous Li solution is described as well as utility as a reversible intercalation host for lithium in a cathode of a rechargeable battery.

Nazri (U.S. Pat. No. 5,604,057) describes a sub-micron size amorphorous, microporous manganese oxide which has an internal surface area greater than about 100 m$^2$/g. The process to make this material includes reduction of permanganate with a manganous salt at low pH and at concentrations less than 0.3 molar. Addition and reaction is conducted with rapid stirring to form a single phase gel containing quatravalent manganese oxide. The gel is dewatered and dried under vacuum at temperatures of 180° C. or less. Electrodes are prepared by mixing the dried particles with a binder, coating a conductive support with the mixture and drying. The formed electrode is described as lithium-intercalateable and the claims recite secondary lithium cell.

Davis et al. (U.S. Pat. No. 6,585,881) describe an electrolysis method for preparing manganese dioxide having a specific surface area from 18 to 45 m$^2$/g. A doping agent such as a soluble titanium dopant is included to obtain a surface area in the stated range. Utility as a cathode material for a primary alkaline cell is described. This reference actually teaches away from a specific surface area above 45 m$^2$/g.

Feddrix et al. (U.S. Pat. No. 7,501,208) describes a doped manganese dioxide electrode material made electrolytically (EMD) or by a wet chemical method (CMD). The manganese dioxide described is preferably a $\gamma$-MnO$_2$.

None of these references discloses or suggests a relationship of surface area of a phase of MnO$_2$ to cathodic performance in a magnesium cell.

The inventors are directing effort and resources to the study of cathode materials useful to produce a magnesium battery of sufficient capacity and cycle lifetime to be useful as a power source for utilities requiring a high capacity and high cycle lifetime. Particularly, the inventors are investigating the chemical and physical properties of MnO$_2$ and the relationship of those properties to performance as an active cathode material in a magnesium cell or battery, preferably a rechargeable magnesium battery.

Therefore, an object of the present invention is to provide a magnesium cell containing an active cathode material which is suitable for utility as a battery having high capacity and high cycle lifetime.

A second object of the invention is to provide a rechargeable magnesium battery having high capacity and high cycle lifetime.

SUMMARY OF THE INVENTION

These and other objects have been achieved according to the present invention, the first embodiment of which includes an electrode active material, comprising: MnO$_2$ nanoparticles having a surface area which is greater than 60 m$^2$/g; wherein the MnO$_2$ nanoparticles are obtained by a process comprising a redox reaction of a Mn (II) salt and permanganate at a reaction temperature less than 30° C. and a pH of 2 to 4. The MnO$_2$ nanoparticles are heat treated at a temperature less than 400° C. for drying and calcination.

In a preferred embodiment, the maximum temperature to which the MnO$_2$ nanoparticles are exposed is the temperature for drying and calcination, and in a further embodiment the MnO$_2$ nanoparticles comprise at least one phase selected from the group consisting of $\alpha$-MnO$_2$, $\beta$-MnO$_2$, $\delta$-MnO$_2$ and $\gamma$-MnO$_2$.

In another preferred embodiment, the present invention includes a magnesium cell, comprising: an anode comprising magnesium; an electrolyte; and a cathode comprising MnO$_2$ nanoparticles; wherein a surface area of the MnO$_2$ nanoparticles is greater than 60 m$^2$/g, and the MnO$_2$ nanoparticles are obtained by a process comprising a redox reaction of a Mn (II) salt and permanganate at a reaction temperature less than 30° C. and a pH of 2 to 4. The MnO$_2$ nanoparticles are heat treated at a temperature less than 400° C. for drying and calcination. In a highly preferred case of this embodiment the maximum temperature to which the MnO$_2$ nanoparticles are exposed is the temperature for drying and calcination.

In another preferred embodiment, the present invention includes a rechargeable magnesium battery, comprising the magnesium cell of the embodiments described.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

In a first embodiment, the present invention provides an electrode active material, comprising: MnO$_2$ nanoparticles having a surface area which is greater than 60 m$^2$/g; wherein the $MnO_2$ nanoparticles are obtained by a process comprising a redox reaction of a Mn (II) salt and permanganate at a reaction temperature less than 30° C. and a pH of 2 to 4. The $MnO_2$ nanoparticles are heat treated at a temperature less than 400° C. for drying and calcination.

In a preferred embodiment, the maximum temperature to which the $MnO_2$ is exposed is the temperature for drying and calcination and in a further embodiment the $MnO_2$ nanoparticles comprise at least one phase selected from the group consisting of $\alpha$-$MnO_2$, $\beta$-$MnO_2$, $\delta$-$MnO_2$ and $\gamma$-$MnO_2$.

The inventors have surprisingly discovered that one factor that relates to the electrochemical capacity of a magnesium cell is the surface area of the $MnO_2$ nanoparticles contained as the cathode active material. The inventors have determined that $MnO_2$ having the a surface area of 60 $m^2$/g may be prepared by a precipitation method wherein an aqueous solution of a water soluble Mn(II) salt is added to an acidic solution of a permanganate salt. The addition is conducted under conditions of vigorous stirring and at a temperature less than 40° C., preferably less than 30° C. and most preferably at a temperature of 25° C. or less.

Any water soluble Mn(II) salt may be employed in the reaction and suitable examples may include halides, acetate, citrate, sulfate and nitrate. In one preferred embodiment the water soluble Mn(II) salt may be manganese nitrate and the permanganate is potassium permanganate.

A stoichiometric ratio of Mn (II) to $MnO_4^-$ may be from to 1.2/1 to 1.8/1, preferably the ratio is 1.5/1.

The addition rate and the rate of agitation may be adjusted to vary the particle size of the precipitated $MnO_2$ nanoparticles.

When the reaction is complete, the $MnO_2$ nanoparticle product mixture may be aged by allowing the mixture to stand without stirring for a period of at least 4 hours, preferably 8 hours of more. The resulting black particles may be separated from the reaction mixture by filtration and washed to free the solid of reaction residues.

The separated solids may then be dried and optionally calcined.

The inventors have determined that the initially obtained $MnO_2$ nanoparticles are a $\gamma$-phase material which upon calcination at temperatures of 400° C. converts to $\beta$-phase.

Figure 1:
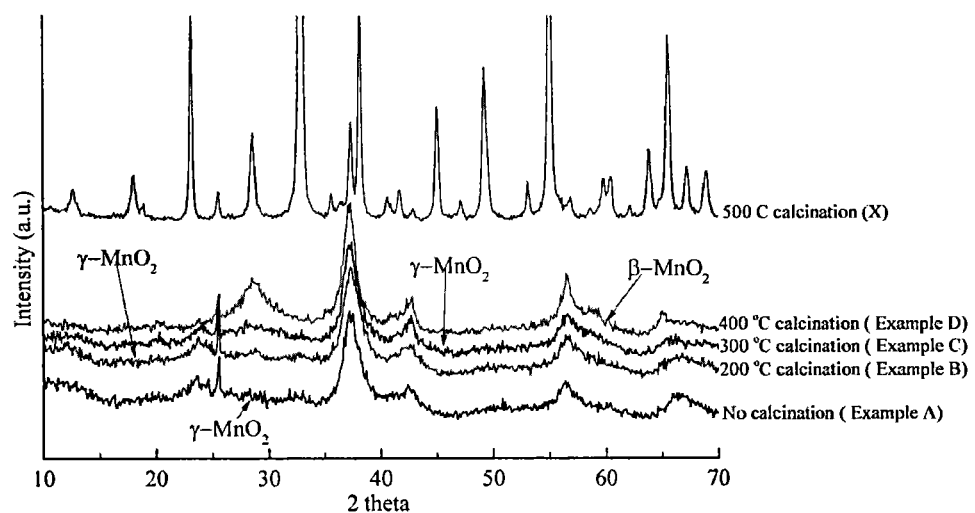
FIG. 1 shows the XRD patterns of the room temperature synthesized MnO$_2$ nanoparticles and the heat treated samples according to various embodiments of the invention.
Figure 2A:
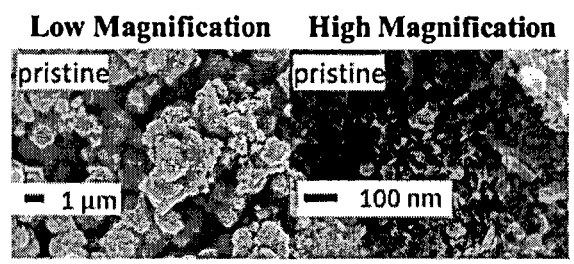
FIG. 2a shows a SEM image of dried MnO$_2$ nanoparticles (not calcined).
Figure 2B:
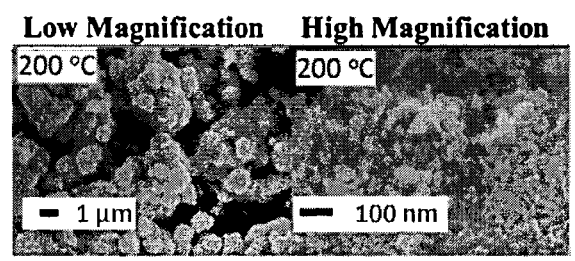
FIG. 2b shows a SEM image of dried and calcined MnO$_2$ nanoparticles (200°).
Figure 2C:
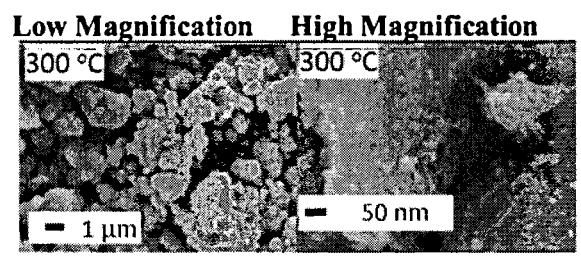
FIG. 2c shows a SEM image of dried and calcined MnO$_2$ nanoparticles (300°).
Figure 2D:
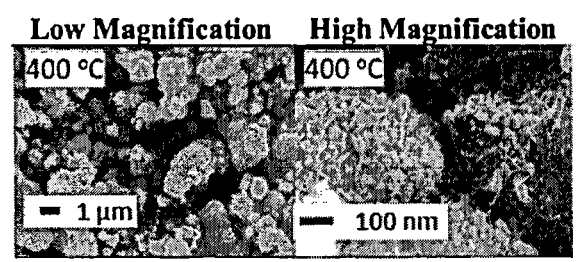
FIG. 2d shows a SEM image of dried and calcined MnO$_2$ nanoparticles (400°).
Figure 2E:
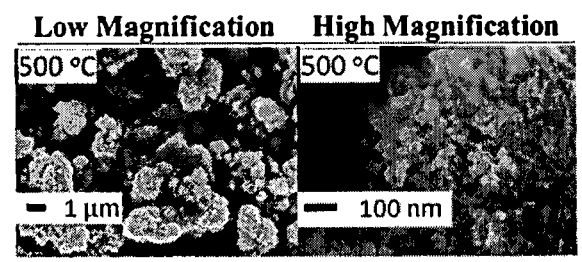
FIG. 2e shows a SEM image of dried and calcined MnO$_2$ nanoparticles (500°).

FIG. 1 shows the X-ray diffraction (XRD) patterns of the synthesized $MnO_2$ nanoparticles and the heat treated samples. The diffraction peaks of the sample simply dried at 70° C. could be assigned to $\gamma$-$MnO_2$. During the heat treatment (200 and 300° C.), the main peaks could still be ascribed to $\gamma$-$MnO_2$. As the temperature increased to 400° C., an extra broad peak at 2 theta 28°, the sample transferred to $\beta$ phase. At 500° C., $\beta$-$MnO_2$ decomposed. The main phase of the final product should be $Mn_2O_3$. This effect is shown in FIGS. 2a through 2e.

Figure 3:
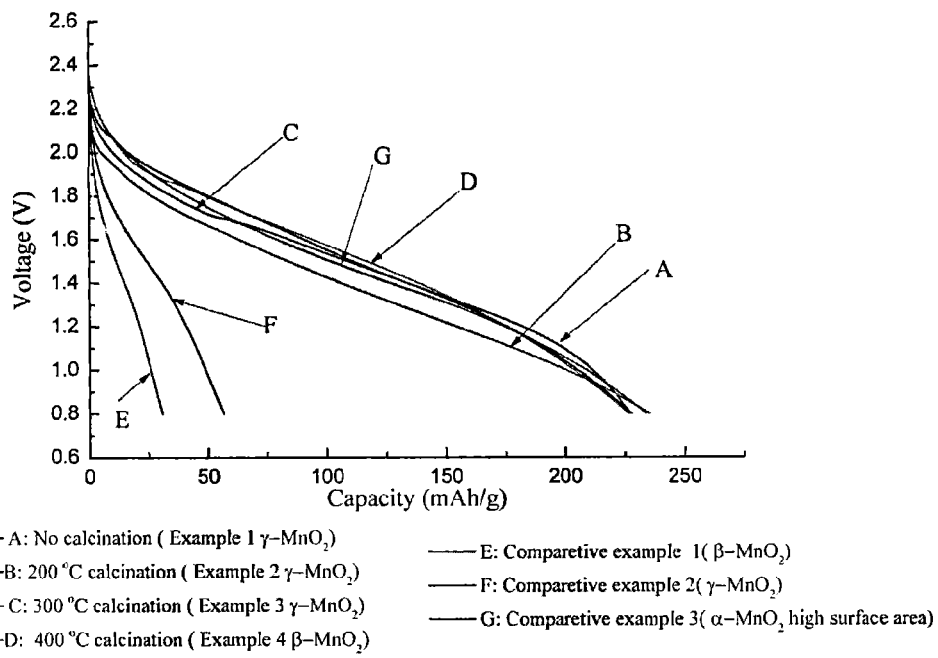
FIG. 3 shows discharge curves of the MnO$_2$ obtained in various embodiments of the invention and the MnO$_2$ of comparative examples.

The inventors have discovered that although the phase of the $MnO_2$ nanoparticles may change based on calcination temperature, performance as a cathode active material may not be related to $MnO_2$ phase as may have been expected. Thus FIG. 3 shows discharge curves of the various $MnO_2$ samples obtained and the $MnO_2$ of the comparative examples. Example samples A, B, C and D ($\beta$ and $\gamma$-$MnO_2$) exhibited much higher discharge capacity as compared with comparative samples E and F and $\gamma$-$MnO_2$). In addition, the capacities of the example samples was very close to another comparative sample G, which is reported in U.S. 2013/0004830 A1.

Figure 4:
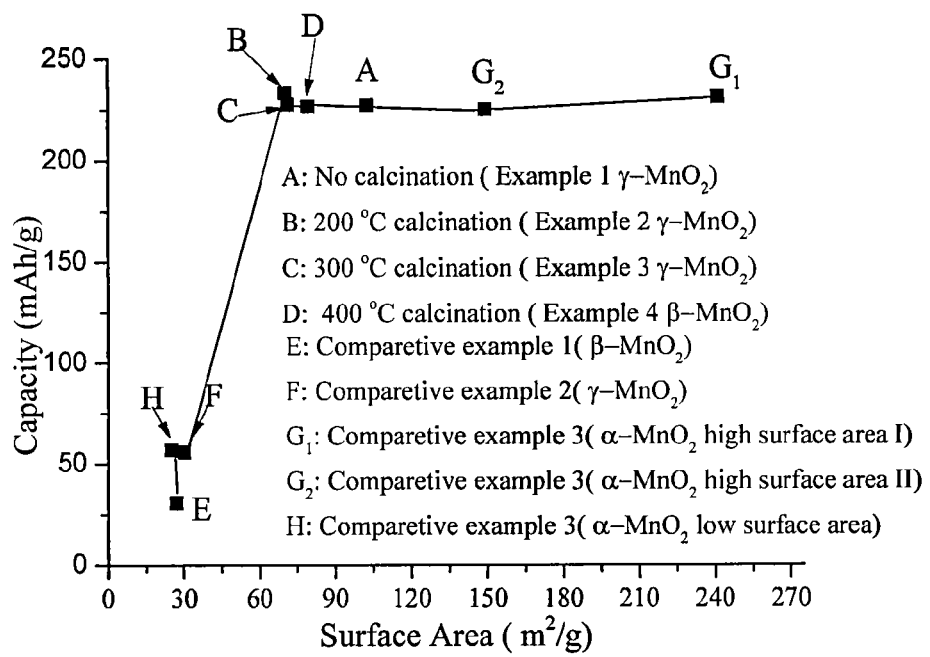
FIG. 4 shows the relation between the surface area of the MnO$_2$ obtained in various embodiments of the invention and the MnO$_2$ of comparative examples with their discharge capacities.

FIG. 4 shows the relation between the surface area of the $MnO_2$ nanoparticle samples synthesized and comparative $MnO_2$ samples and their discharge capacities. High discharge capacity was obtained when the surface area of the $MnO_2$ was higher than 60 $m^2$/g. Thus, as indicated in FIG. 4 the discharge capacity of $MnO_2$ is related to surface area but surprisingly, no relationship with phase structure is indicated.

Figure 5:
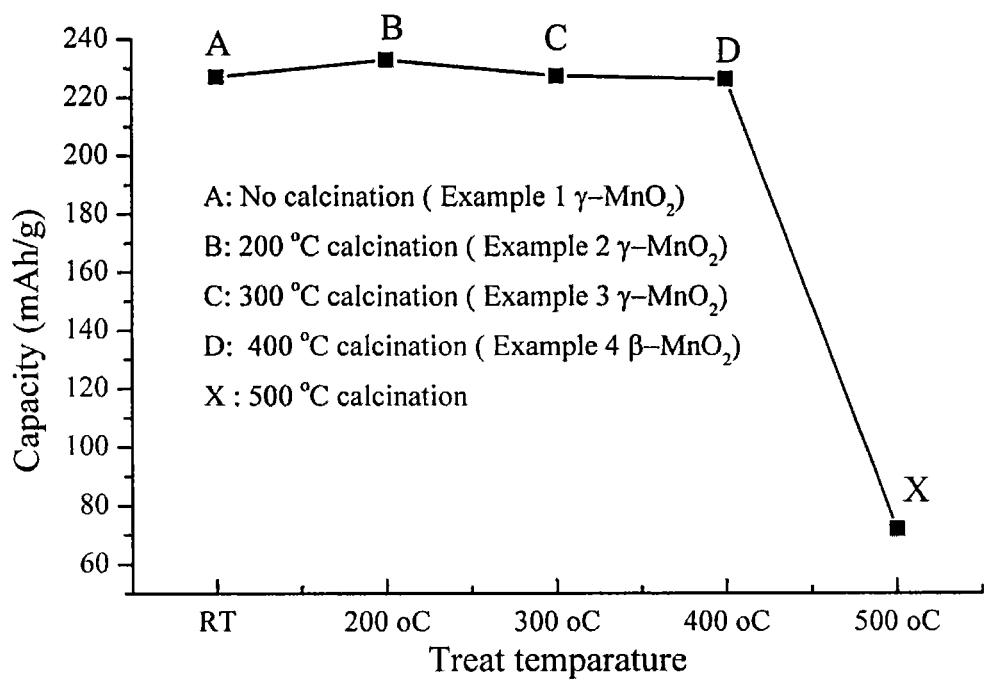
FIG. 5 shows the relation between the calcination temperature and the discharge capacity of the MnO$_2$ samples of various embodiments of the invention.

This lack of apparent relationship between phase structure of $MnO_2$ and cathodic performance as indicated by discharge capacity is further shown in FIG. 5, where as long as $MnO_2$ is not degraded in calcination capacity is nearly stable.

The present invention also provides a rechargeable magnesium cell having a cathode containing $MnO_2$ nanoparticles having a surface area which is greater than 60 $m^2$/g; wherein the $MnO_2$ nanoparticles are obtained by a process comprising a redox reaction of a Mn (II) salt and permanganate at a reaction temperature less than 30° C. and a pH of 2 to 4, according to the invention.

Thus, a rechargeable magnesium cell of the invention includes an anode of magnesium metal or a composition containing magnesium metal and a cathode containing the $MnO_2$ nanoparticles having a surface area which is greater than 60 $m^2$/g; wherein the $MnO_2$ nanoparticles are obtained by a process comprising a redox reaction of a Mn (II) salt and permanganate at a reaction temperature less than 30° C. and a pH of 2 to 4, according to the invention.

The cathode active material may further include another metal oxide material, such as $V_2O_5$ or hollandiates of titanium or vanadium. The active material may further include an electrically conductive material and a binder. Examples of electrically conducting materials include carbon particles, such as carbon black. Example binders include various polymers, such as PVDF, PTFE, SBR, and polyimide.

The anode active material may further include an electrically conductive material and a binder. Examples of electrically conducting materials include carbon particles, such as carbon black. Example binders include various polymers, such as PVDF, PTFE, SBR, and polyimide.

An electrolyte layer is disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include HMDSMgCl—$AlCl_3$ in THF, PhMgCl—$AlCl_3$ in THF. Examples of electrolyte systems which may be suitable are described in U.S. Pat. No. 8,354,193 and U.S. Pat. No.

8,318,354. The cathode active material and may be present as a sheet, ribbon, particles, or other physical form. An electrode containing the cathode active material may be supported by a current collector.

A current collector may include a metal or other electrically conducting sheet on which the electrode is supported. The current collector may be formed of carbon, carbon paper, carbon cloth or a metal or noble metal mesh or foil.

Figure 6:
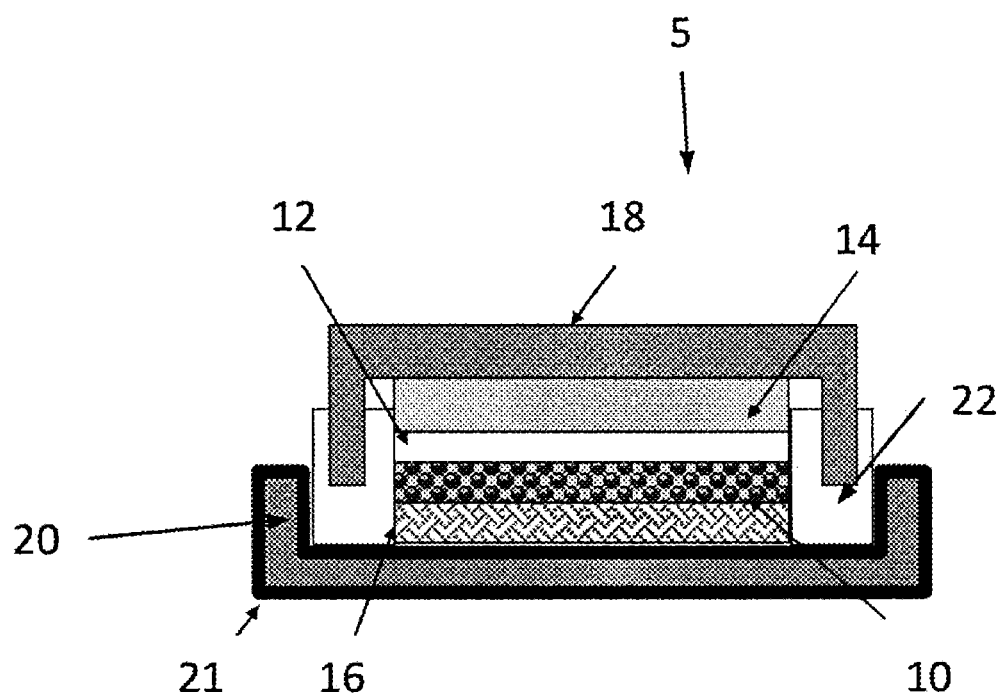
FIG. 6 shows a diagram of a magnesium battery according to one embodiment of the invention.

FIG. 6 shows an example of one configuration of a rechargeable magnesium cell 5. The cell 5 includes a positive electrode 10 comprising as a cathode active material, $MnO_2$ nanoparticles according to the invention, having a surface area greater than 60 $m^2/g$; wherein the $MnO_2$ nanoparticles are obtained by a process comprising a redox reaction of a Mn (II) salt and permanganate at a reaction temperature less than 30° C. and a pH of 2 to 4, an electrolyte layer 12, a negative electrode 14, a cathode current collector 16, a negative electrode housing 18, a positive electrode housing 20 including an inert layer 21, and a sealing gasket 22. The electrolyte layer 16 may include a separator soaked in electrolyte solution, and the positive electrode 10 may be supported by the cathode current collector 16. In this example, the negative electrode 14 includes an active material of magnesium metal.

The ether solvent may be one or more of tetrahydrofuran, ethylene glycol dimethyl ether and bis 2-methoxy ethyl ether in consideration of utility in a battery, safety and ease of handling. Tetrahydrofuran may be most preferred, although battery construction and requirements may dictate the necessity for an ether with different physical properties.

The invention further provides a rechargeable magnesium battery containing the magnesium electrochemical cell according to the embodiments described above.

Having generally described this invention, a further understanding can be obtained by reference to certain specific examples which are provided herein for purposes of illustration only and are not intended to be limiting unless otherwise specified.

EXAMPLES

The $MnO_2$ synthesis was performed by a precipitation method. Stoichiometric amount of $Mn(NO_3)_2$ aqueous solution (0.07874 M, 40 ml) was slowly added to 42 ml acidic $KMnO_4$ aqueous solution (where the concentrations of $KMnO_4$ and $HNO_3$ were 0.0525 M and 0.777 M, respectively) under vigorous stirring at room temperature. After the precipitation reaction completed, the mixture was aged overnight without stirring. The black product was filtered and rinsed with distilled water and ethanol to remove any chemical impurity. The resultant sample was dried in an oven at 70° C. overnight. The dried samples were calcinated at 200, 300 400 and 500° C. for 3 h, respectively.

The comparative examples ($\alpha$-, $\beta$- and $\gamma$-$MnO_2$) were readily accessible manganese oxides.

FIG. 1 shows the XRD patterns of the R.T. synthesized $MnO_2$ nanoparticles and the heat treated samples. The diffraction peaks of no calcinated sample could be assigned to $\gamma$-$MnO_2$. During the heat treatment (200 and 300° C.), the main peaks could still be ascribed to $\gamma$-$MnO_2$. As the temperature increased to 400° C., an extra broad peak at 2 theta 28°, the sample transferred to $\beta$ phase. At 500° C., $\beta$-$MnO_2$ decomposed. The main phase of the final product should be $Mn_2O_3$.

FIGS. 2a-e show the SEM images for the samples calcined at the different temperatures.

FIG. 3 shows discharge curves of the $MnO_2$ obtained in this study and the $MnO_2$ of the comparative examples. Example samples A, B, C and D ($\beta$ and $\gamma$-$MnO_2$) exhibited much higher discharge capacity as compared with comparative samples E and F ($\beta$ and $\gamma$-$MnO_2$). In addition, the capacities of the example samples were very close to another comparative sample G, which is reported in U.S. 2013/0004830 A1.

FIG. 4 shows the relation between the surface area of the $MnO_2$ samples (synthesized examples and comparative examples) and their discharge capacities. High discharge capacity was obtained when the surface area of the $MnO_2$ was higher than 60 $m^2/g$. This result also indicated that the discharge capacity of $MnO_2$ is mainly determined by surface area but has no relationship with phase structure.

FIG. 5 shows the relation between the calcination temperature and the discharge capacity of the $MnO_2$ samples obtained in this invention. Stable discharge capacity was kept through pristine sample (no calcination) to 400° C. heat treated one. However, as the calcination temperature increased to 500° C., significant capacity fading occurred, which was because $MnO_2$ was decomposed to $Mn_2O_3$.

The invention claimed is:

1. A magnesium cell, comprising:
an anode comprising magnesium;
a non-aqueous electrolyte; and
a cathode comprising $MnO_2$ nanoparticles;
wherein
a surface area of the $MnO_2$ nanoparticles is greater than 60 $m^2/g$,
the $MnO_2$ nanoparticles comprise at least one phase selected from the group consisting of $\alpha$-$MnO_2$, $\beta$-$MnO_2$, $\delta$-$MnO_2$, and $\gamma$-$MnO_2$, and
the $MnO_2$ nanoparticles are obtained by a process comprising a redox reaction of a Mn(II) salt and permanganate at a reaction temperature less than 30° C. and a pH of 2 to 4.

2. The magnesium cell of claim 1, wherein the $MnO_2$ nanoparticles are heat treated at a temperature less than 400° C. for drying and calcination.

3. The magnesium cell of claim 2, wherein a maximum temperature to which the $MnO_2$ nanoparticles are exposed is the temperature for drying and calcination.

4. The magnesium cell of claim 1, wherein the non-aqueous electrolyte comprises an organic solvent, an aprotic liquid or a polymer infused with magnesium ions.

5. The magnesium cell of claim 4, comprising an organic solvent wherein the organic solvent is an ether selected from the group consisting of tetrahydrofuran, ethylene glycol dimethyl ether and his 2-methoxy ethyl ether.

6. The magnesium cell of claim 1, wherein the cathode further comprises an additive selected from the group consisting of $V_2O_5$, a hollandiate of vanadium and a hollandiate of titanium.

7. The magnesium cell of claim 1, further comprising a separator between the anode and cathode.

8. The magnesium cell of claim 1, wherein the anode further comprises carbon particles.

9. A rechargeable magnesium battery, comprising the magnesium cell of claim 1.

10. The rechargeable magnesium battery of claim 9, wherein the $MnO_2$ nanoparticles are heat treated at a temperature less than 400° C. for drying and calcination.

11. The rechargeable magnesium battery of claim 9, wherein a maximum temperature to which the $MnO_2$ nanoparticles are exposed is the temperature for drying and calcination.

12. The rechargeable magnesium battery of claim 9, wherein the non-aqueous electrolyte comprises an organic solvent, an aprotic liquid or a polymer infused with magnesium ions.

13. The rechargeable magnesium battery of claim 12, comprising an organic solvent wherein the organic solvent is an ether selected from the group consisting of tetrahydrofuran, ethylene glycol dimethyl ether and bis 2-methoxy ethyl ether.

14. The rechargeable magnesium battery of claim 9, wherein the cathode further comprises an additive selected from the group consisting of $V_2O_5$, a hollandiate of vanadium and a hollandiate of titanium.

15. The rechargeable magnesium battery of claim 9, further comprising a separator between the anode and cathode.

16. The rechargeable magnesium battery of claim 9, wherein the anode further comprises carbon particles.

\* \* \* \* \*